United States Patent
Sayyed et al.

(10) Patent No.: US 12,474,919 B2
(45) Date of Patent: Nov. 18, 2025

(54) FIRMWARE DISTRIBUTION METHOD FOR AN INFORMATION HANDLING SYSTEM

(71) Applicant: Dell Products L.P., Round Rock, TX (US)

(72) Inventors: Ibrahim Sayyed, Georgetown, TX (US); Daniel Hamlin, Round Rock, TX (US); Venkata Rama Krishna Rao Atta, Hyderabad (IN)

(73) Assignee: Dell Products L.P., Round Rock, TX (US)

( * ) Notice: Subject to any disclaimer, the term of this patent is extended or adjusted under 35 U.S.C. 154(b) by 257 days.

(21) Appl. No.: 18/336,244

(22) Filed: Jun. 16, 2023

(65) Prior Publication Data

US 2024/0419434 A1 Dec. 19, 2024

(51) Int. Cl.
*G06F 9/44* (2018.01)
*G06F 8/654* (2018.01)
*G06F 8/71* (2018.01)

(52) U.S. Cl.
CPC ............... *G06F 8/654* (2018.02); *G06F 8/71* (2013.01)

(58) Field of Classification Search
None
See application file for complete search history.

(56) References Cited

U.S. PATENT DOCUMENTS

| 11,550,918 B2 * | 1/2023 | Schack | G06F 21/572 |
| 2005/0177709 A1 * | 8/2005 | Kim | G06F 8/65 |
| | | | 713/1 |
| 2016/0231804 A1 * | 8/2016 | Bulusu | G06F 1/3234 |
| 2019/0087174 A1 * | 3/2019 | Lappi | G06F 8/654 |
| 2020/0201714 A1 * | 6/2020 | Montero | G06F 11/1469 |
| 2023/0046674 A1 * | 2/2023 | Liu | G06F 11/1448 |

FOREIGN PATENT DOCUMENTS

| WO | WO-2021262161 A1 * | 12/2021 | G06F 21/572 |
| WO | WO-2022061859 A1 * | 3/2022 | |

OTHER PUBLICATIONS

Christopher Trick, Volatile Memory vs. Nonvolatile Memory: What's the Difference?, Jul. 2022 (Year: 2022).*

* cited by examiner

*Primary Examiner* — Bradley A Teets
*Assistant Examiner* — Lanny N Ung
(74) *Attorney, Agent, or Firm* — Norton Rose Fulbright US LLP

(57) ABSTRACT

A method for updating firmware on a device in an information handling system in a resilient manner is described. The method includes receiving a new firmware for updating a device; storing a current firmware image or a working copy of the current firmware of the device in a volatile memory; updating the device with the new firmware after storing the current firmware in the volatile memory; setting a first boot flag to perform diagnostics at a next reset of the information handling system based on updating the device with the new firmware; and determining, by the information handling system at the next reset in response to the first boot flag, whether the device satisfies at least one criteria indicating the new firmware is operational on the device. An information handling system that includes the device and performs the method is also described.

17 Claims, 4 Drawing Sheets

FIRMWARE DISTRIBUTION METHOD FOR AN INFORMATION HANDLING SYSTEM

FIELD OF THE DISCLOSURE

The instant disclosure relates to information handling systems. More specifically, portions of this disclosure relate to resilient methods for updating firmware on devices in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Firmware corruption on devices in an information handling system is a problem for information handling systems. In some examples, firmware corruption can create a "no host OS boot" situation that causes a boot failure or create a situation that causes devices to fail to be detected at boot. For storage devices, such a failure can result in files that cannot be read or written, which results in a loss of user data and a poor user experience.

SUMMARY

Aspects of this disclosure describe techniques by which an information handling system (such as a laptop computer, a desktop computer, or a mobile computing device) can update a firmware of a device in a resilient manner. Embodiments may provide the ability to revert to a previous firmware image if a new firmware image loaded on the device during the update is corrupted. During the update process, the system stores a copy of the current firmware configuration into RAM (as the previous firmware image) before updating the device with the new firmware image. The previous firmware is maintained in RAM while the system restarts and verifies the new firmware is operational on the device. If the new firmware was corrupt or otherwise created a failure for the device upon system restart, the system can retrieve the previous firmware from RAM and restore that previous firmware to the device.

Shortcomings mentioned above regarding firmware corruption are only representative and are included to highlight problems that the inventors have identified with respect to existing information handling systems and sought to improve upon. Aspects of the information handling systems described below may address some or all of the shortcomings as well as others known in the art. Aspects of the improved information handling systems described below may present other benefits than, and be used in other applications than, those described above.

According to one embodiment, a method may include receiving, by an information handling system, a new firmware for updating a device; storing, by the information handling system, a current firmware of the device in a volatile memory; updating, by the information handling system, the device with the new firmware after storing the current firmware in the volatile memory; setting, by the information handling system, a first boot flag to perform diagnostics at a next reset of the information handling system based on updating the device with the new firmware; and determining, by the information handling system at the next reset in response to the first boot flag, whether the device satisfies at least one criteria indicating the new firmware is operational on the device.

In certain embodiments, the method may include, when the at least one criteria is not satisfied, updating, by the information handling system, the device with the current firmware. Additionally or alternatively, in certain embodiments, the method may include setting, by the information handling system, a second boot flag to set the next reset of the information handling system for maintaining an operational voltage at the volatile memory during the reset. Setting the second boot flag may include disabling a power button from disconnecting power to the information handling system.

In certain embodiments, the method may include storing an update context corresponding to the new firmware in a second volatile memory corresponding to an embedded controller. The update context may include at least one of a device version, a device configuration, a firmware version, a network URL, and a reason for performing a restart.

In certain embodiments, the device on which the firmware is updated by the method may be a storage device, for example, a solid-state storage device.

The method may be embedded in a computer-readable medium as computer program code comprising instructions that cause a processor to perform operations corresponding to the steps of the method. In some embodiments, the processor may be part of an information handling system including a first network adaptor configured to transmit data over a first network connection; and a processor coupled to the first network adaptor, and the memory.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

Unless specifically stated otherwise as apparent from the following discussions, it is appreciated that throughout the present application, discussions utilizing the terms such as "accessing," "receiving," "retrieving," "sending," "using," "selecting," "determining," "normalizing," "multiplying," "averaging," "monitoring," "comparing," "storing," "applying," "updating," "measuring," "deriving," "settling," "generating" or the like, refer to the actions and processes of a computer system, audio controller, or similar electronic computing device that manipulates and transforms data represented as physical (electronic) quantities within the computer system's registers and memories into other data similarly represented as physical quantities within the computer system's registers, memories, or other such information storage, transmission, or display devices.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
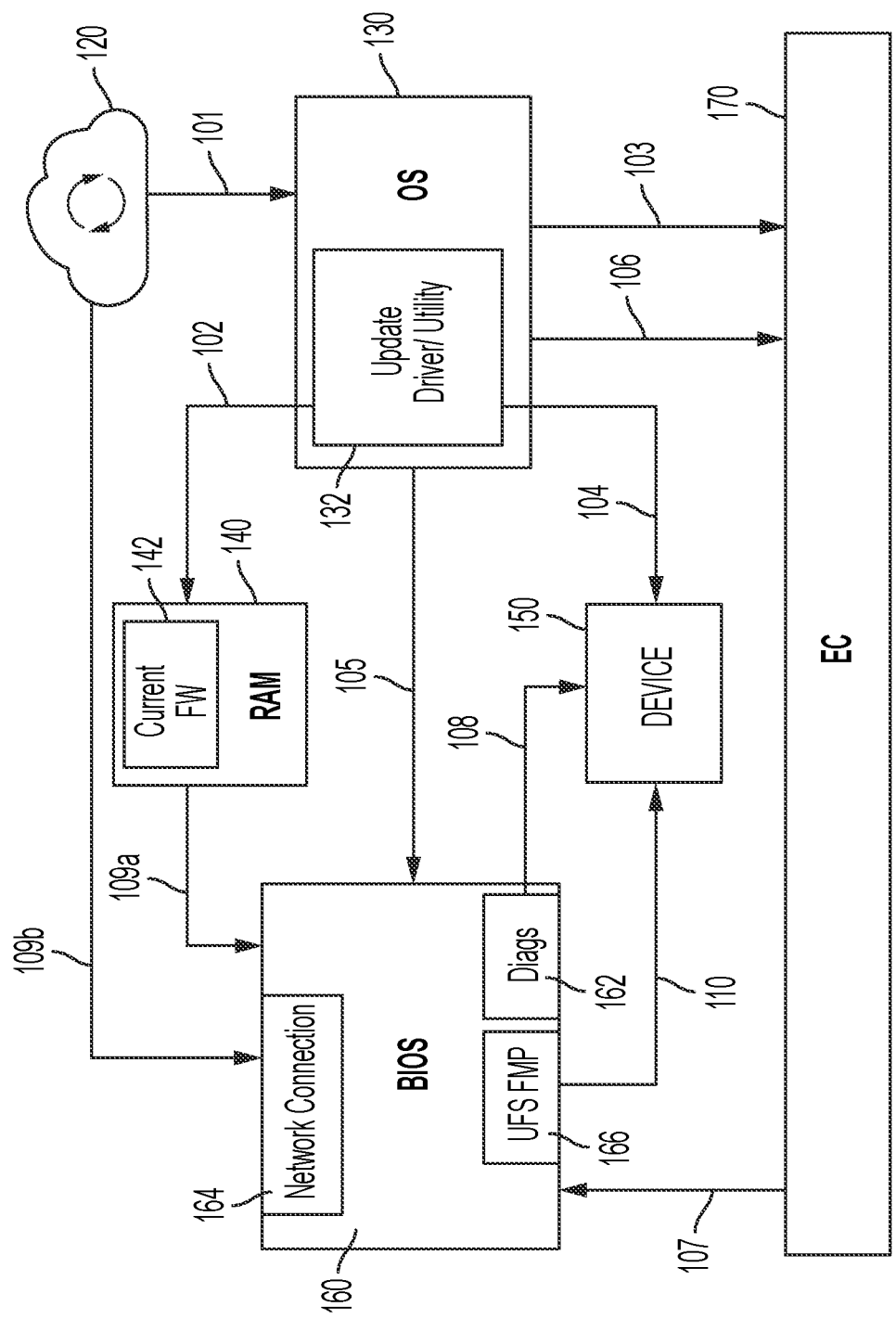
FIG. 1 is a schematic block diagram of aspects of an information handling system according to some embodiments of the disclosure.

Reference is now made to FIG. 1, which is a schematic block diagram of aspects of an information handling system according to some embodiments of the disclosure. FIG. 1 provides an overview of a method for updating firmware on a device in an information handling system. At a high level, an information handling system may store a backup copy of a current device firmware in a memory to allow recovery of the firmware during a system reboot. According to some aspects of the disclosure, an Operating System (OS) of the information handling system 130 retrieves a new firmware update for device 150, such as via a network connection from the cloud 120, stores a current firmware 142 to volatile memory 140, which may be a RAM volatile memory, updates the device 150 with the new firmware update, and directs Basic Input/Output System (BIOS) 160 to set a boot flag indicating that the next restart cycle should include a diagnostic cycle. OS 130 may then direct an embedded controller (EC) 170 to perform a restart of the system. In some implementations, the restart may be a warm restart, or a restart that maintains sufficient voltage at the volatile memory 140 to power the volatile memory 140 such that the volatile memory 140 can retain the information stored on it before the restart, including the current firmware 142. After the restart, BIOS 160 may perform a diagnostic check of the device 150 to determine if the new firmware update was successful and to make sure that the device 150 is still accessible. If the device 150 is not accessible then BIOS 160 may retrieve the current firmware 142 from the volatile memory 140 and update the device 150 with the current firmware 142 before booting to the OS 130.

Device 150 may be any one of a number of devices that includes a firmware. For example, the device 150 may be a storage device, a peripheral device, an input/output device, a graphical processing unit, and/or some other device used by and/or connected to the information handling system. If device 150 is a storage device, it may be a nonvolatile memory storage device such as a hard disk drive, a flash memory device (e.g., a Universal Flash Storage (UFS)-compatible device), a solid state device (SSD) drive, a phase-change memory device, a flash drive, a magnetic storage device, and/or some other device that stores information and includes a firmware.

Figure 2:
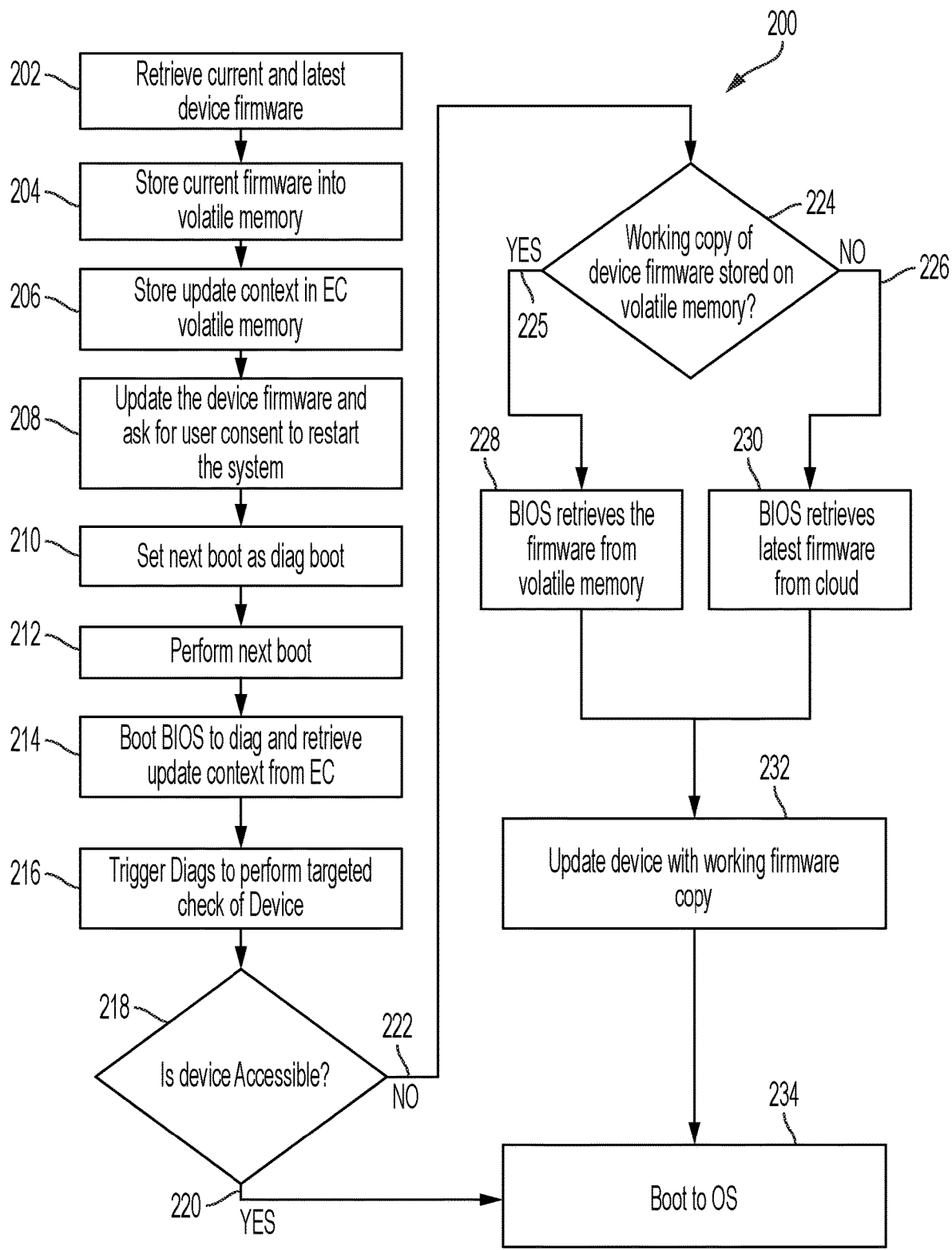
FIG. 2 is a flow diagram of an example method of performing a firmware update according to some embodiments of the disclosure.

The updating process is now described in more detail with reference to the flow diagram of FIG. 2, which shows an example method of performing a firmware update according to some embodiments of the disclosure. In FIG. 2, process 200 represents an example embodiment of a firmware update process. At operation 202, the information handling system, such as through a driver or application, retrieves the current firmware of a device from the device and the latest firmware. The latest firmware may be retrieved from the cloud via a network connection. Retrieving the latest firmware may include or correspond to operation 101 in FIG. 1. Alternatively, the update driver may retrieve the latest firmware update from some other location, such as from a computer readable medium or from another location in the information handling system. For example, the information handling system may retrieve the current firmware and the latest firmware using an application or a driver, which may include or correspond to the Update Driver/Utility 132 in FIG. 1 (e.g., an updating driver or application). The latest firmware update may be in the form of an executable file or some other file type. In some aspects, the information handling system, (e.g., through an OS, a driver, and/or an application) may retrieve the latest firmware update in response to a notification that a firmware update is available.

At operation 204, the information handling system may store the current firmware in a volatile memory. Operation 204 may include or correspond to operation 102 in FIG. 1. The current firmware, which may include or correspond to current firmware 142 in FIG. 1, may include a firmware image, a particular configuration of the firmware, a copy of the firmware, and/or some other information sufficient to identify the working firmware currently running on the device. The current firmware may be stored in a volatile memory so that the current firmware may be restored to the device in the event that the new firmware associated with the latest firmware update is corrupted, incomplete, and/or otherwise damaged. For example, a corrupted firmware may render the device inaccessible or inoperable. Storing the working current firmware in volatile memory during the restart process can thus provide a measure of system resiliency to protect against corrupted firmware and allow the device to be used in or by the information handling system.

At operation 206, the information handling system may store an update context corresponding to the new firmware associated with the latest firmware update in a volatile memory. For example, operation 206 may include or correspond to operation 103 in FIG. 1. The volatile memory may include the same volatile memory that the current firmware was stored in during operation 204. Additionally or alternatively, the volatile memory may include a second volatile memory corresponding to an embedded controller. For example, the embedded controller may include or correspond to embedded controller 170 of FIG. 1. The update context may include information regarding the update, non-limiting examples of which may include a device version, a device configuration, a firmware version, a network URL, and a reason for performing a restart.

At operation 208, the information handling system updates the device firmware. The system may ask a user for consent to restart the system, inform a user of a pending restart, or otherwise prompt user action. In some implementations, asking for user consent may include displaying a dialog box or some other user interface element prompting user action. Alternatively or additionally, the system may inform a user that a restart is pending and will be performed automatically unless the user acts to delay, prevent, or otherwise stop the restart process. Operation 208 may include or correspond to operation 104 in FIG. 1.

At operation 210, the information handling system sets a first boot flag in the BIOS configured to direct the BIOS to perform diagnostics at a next reset of the information handling system based on updating the device with the new firmware. For example, operation 210 may include or correspond to operation 105 in FIG. 1.

At operation 212, the information handling system directs the embedded controller to perform the next restart. For example, operation 212 may include or correspond to operation 106 in FIG. 1. In some implementations, directing the embedded controller to perform the next restart may include setting, by the information handling system, a second boot flag to set the next reset of the information handling system for maintaining an operational voltage at the volatile memory during the reset. This second boot flag would indicate that the next reset would be a "warm reset" or "warm reboot," a reset in which an operational voltage is maintained at the volatile memory during the reset, or in other words in which power is not removed from the volatile memory. For example, a warm reset of the system components in FIG. 1, would be a reset that maintains sufficient voltage at the volatile memory 140 to power the volatile memory 140 such that the volatile memory 140 can retain the information stored on it before the restart, including the current firmware 142. This would prevent information from being lost from the volatile memory while the system is reset. In some implementations, setting the second boot flag comprises disabling a power button from disconnecting power to the information handling system. In implementations in which a second volatile memory associated with the embedded controller is used, an operational voltage may be maintained at the second volatile memory as well. In this regard, the volatile memory or memories may keep the context(s) stored on them, including the current firmware and the update context, to be accessed after the reset. Additionally, a warm reset can decrease delays in the reboot process compared to a "cold reboot" in which devices are powered down and contexts stored in volatile memory are removed.

Figure 3:
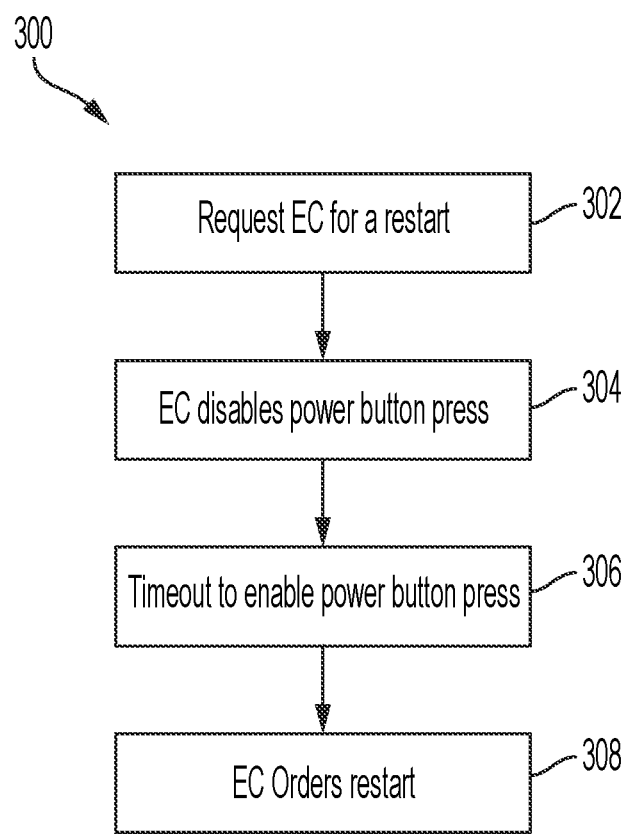
FIG. 3 is a flow diagram of an example method of performing a restart of the information handling system according to some embodiments of the disclosure.

The process of resetting the information handling system as described above may include additional steps, such as those illustrated in FIG. 3. FIG. 3 shows a flow diagram of an example method 300 of performing a restart of the information handling system according to some embodiments of the disclosure. At operation 302, the information handling system may request that the EC perform a restart. At operation 304, the EC may disable a power button press from functioning. This may prevent mixed or conflicting signals from being sent. For example, if a power button press would cause a cold reboot to occur, the cold reboot could interrupt the warm reset in process, potentially damaging or deleting the information associated with the warm reset, including the current firmware information and the update context. The EC may also disable or restrict other input/output channels and/or devices for similar reasons. At operation 306, the EC may perform a timeout to enable the power button press. In some implementations, the timeout may last for up to 5 seconds or longer. In such implementations, the EC may restrict the access to a power button press and prevent the system from performing a boot deviation for the whole timeout period. This is to avoid the deviation from interrupted flows. In other words, the timeout function may allow sufficient time for the reset to occur and to prevent the edge cases of additional signals from the power button or other I/O devices from creating conflicting instructions or operations in the EC, OS, BIOS, or other components of the information handling system during the reset. In some implementations, the timeout period may extend until the end of the diagnostic boot process to avoid the potential for mixed or conflicting signals. At operation 308, the EC orders a restart, as requested.

Returning to FIG. 2, at operation 214 the BIOS boots to a diagnostic state following the reset. The BIOS may also retrieve the update context from the EC, in implementations in which the update context is stored in a volatile memory associated with the EC. For example, operation 214 may include or correspond to operation 107 in FIG. 1. At operation 216, based on the first boot flag, the BIOS may trigger diagnostics to perform a targeted check of the device, such as to make sure the device is enumerated during the reboot and indicates an expected firmware version. For example, operation 216 may include or correspond to operation 108. For example, the targeted check may determine whether the device is accessible, as shown in determination 218. In some implementations, the device may include a firmware self-test function that is performed at this stage. The targeted check may also determine whether a firmware corresponding to the update context is properly installed, updated, and/or configured. If the targeted check determines at determination 218 that the device is accessible, then the BIOS causes the OS to boot as normal, which is represented by path 220 to operation 234. If the device is not accessible, then path 222 to determination 224 is taken.

At determination 224, the BIOS determines whether a working copy of the device firmware is stored in volatile memory. If a working copy of the device firmware is stored in volatile memory, then the process 200 proceeds down branch 225 to operation 228, in which the BIOS may retrieve the current firmware from the volatile memory. For example, operation 228 may include or correspond to operation 109a in FIG. 1. If a working copy of the device firmware is not stored in volatile memory, such as, for example, if the current firmware has been corrupted or if a cold reboot process was performed instead of a warm restart, then the process 200 proceeds down branch 226 to operation 230, at which point the BIOS may retrieve a previous or known-good version of the firmware from the cloud via a network connection. As an example, operation 230 may include or correspond to operation 109b in FIG. 1. In either case, the process 200 then proceeds to operation 232, in which the BIOS updates the device with a working firmware copy. For example, operation 232 may include or correspond to operation 110 in FIG. 1. Next, the process 200 proceeds to operation 234, in which the BIOS boots to the OS.

The schematic flow chart diagrams of FIGS. 2 and 3 are generally set forth as logical flow chart diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

These example embodiments describe and illustrate various aspects used in the updating of firmware in a device (e.g., a storage device 424, a user device 150, etc.) and the boot process of an information handling system after updating the firmware. For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. One example configuration of an information handling system is described with reference to FIG. 4.

Figure 4:
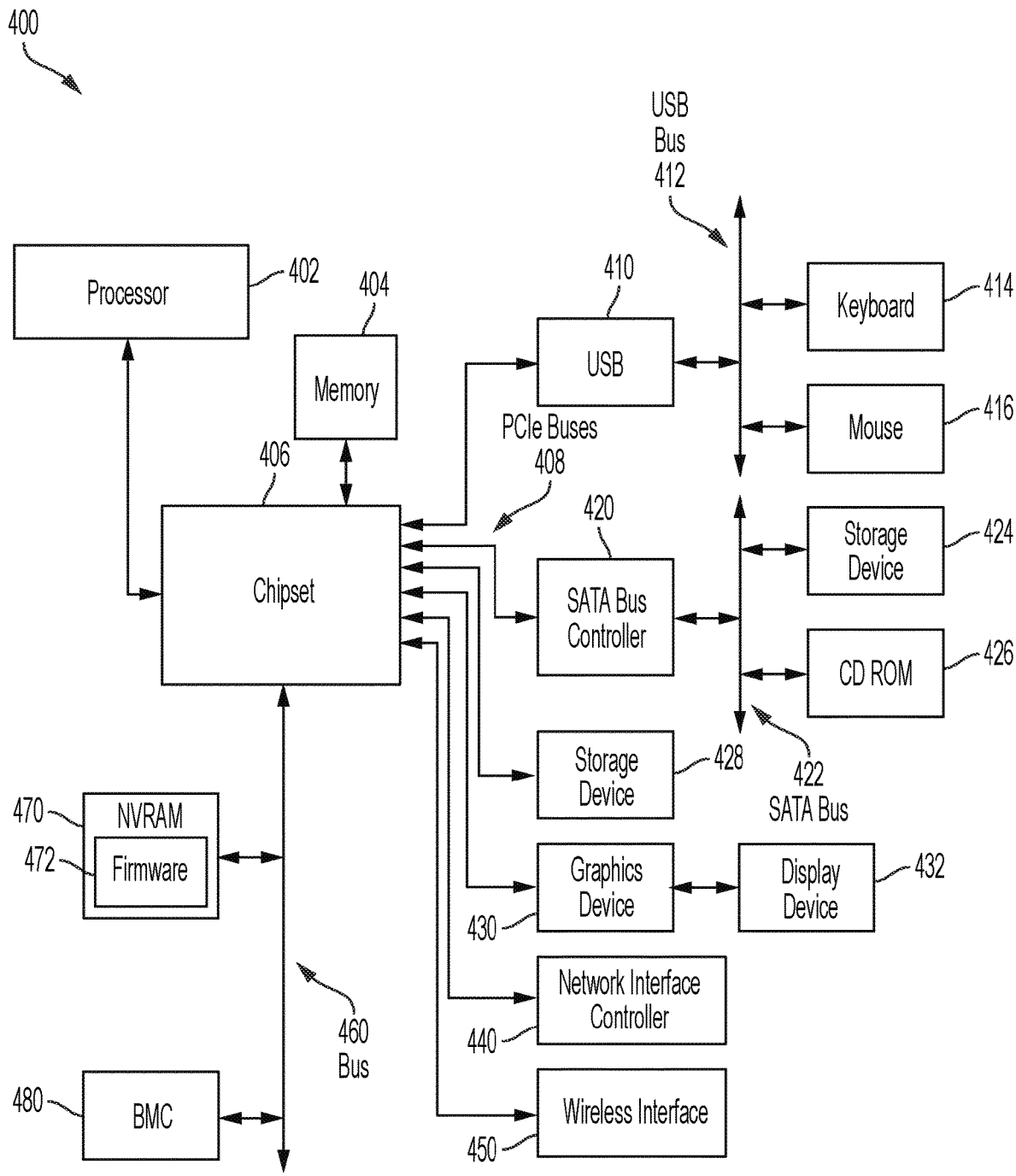
FIG. 4 is a schematic block diagram of an example information handling system according to some embodiments of the disclosure.

FIG. 4 illustrates an example information handling system 400. Information handling system 400 may include a processor 402 (e.g., a central processing unit (CPU)), a memory (e.g., a dynamic random-access memory (DRAM)) 404, and a chipset 406. In some embodiments, one or more of the processor 402, the memory 404, and the chipset 406 may be included on a motherboard (also referred to as a mainboard), which is a printed circuit board (PCB) with embedded conductors organized as transmission lines between the processor 402, the memory 404, the chipset 406, and/or other components of the information handling system. The components may be coupled to the motherboard through packaging connections such as a pin grid array (PGA), ball grid array (BGA), land grid array (LGA), surface-mount technology, and/or through-hole technology. In some embodiments, one or more of the processor 402, the memory 404, the chipset 406, and/or other components may be organized as a System on Chip (SoC).

The processor 402 may execute program code by accessing instructions loaded into memory 404 from a storage device, executing the instructions to operate on data also loaded into memory 404 from a storage device, and generate output data that is stored back into memory 404 or sent to another component. The processor 402 may include processing cores capable of implementing any of a variety of instruction set architectures (ISAs), such as the x86, POWERPC®, ARM®, SPARC®, or MIPS® ISAs, or any other suitable ISA. In multi-processor systems, each of the processors 402 may commonly, but not necessarily, implement the same ISA. In some embodiments, multiple processors may each have different configurations such as when multiple processors are present in a big-little hybrid configuration with some high-performance processing cores and some high-efficiency processing cores. The chipset 406 may facilitate the transfer of data between the processor 402, the memory 404, and other components. In some embodiments, chipset 406 may include two or more integrated circuits (ICs), such as a northbridge controller coupled to the processor 402, the memory 404, and a southbridge controller, with the southbridge controller coupled to the other components such as USB 410, SATA 420, and PCIe buses 408. The chipset 406 may couple to other components through one or more PCIe buses 408.

Some components may be coupled to one bus line of the PCIe buses 408, whereas some components may be coupled to more than one bus line of the PCIe buses 408. One example component is a universal serial bus (USB) controller 410, which interfaces the chipset 406 to a USB bus 412. A USB bus 412 may couple input/output components such as a keyboard 414 and a mouse 416, but also other components such as USB flash drives, or another information handling system. Another example component is a SATA bus controller 420, which couples the chipset 406 to a SATA bus 422. The SATA bus 422 may facilitate efficient transfer of data between the chipset 406 and components coupled to the chipset 406 and a storage device 424 (e.g., a hard disk drive (HDD) or solid-state disk drive (SDD)) and/or a compact disc read-only memory (CD-ROM) 426. The PCIe bus 408 may also couple the chipset 406 directly to a storage device 428 (e.g., a solid-state disk drive (SDD)). A further example of an example component is a graphics device 430 (e.g., a graphics processing unit (GPU)) for generating output to a display device 432, a network interface controller (NIC) 440, and/or a wireless interface 450 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces).

The chipset 406 may also be coupled to a serial peripheral interface (SPI) and/or Inter-Integrated Circuit (I2C) bus 460, which couples the chipset 406 to system management components. For example, a non-volatile random-access memory (NVRAM) 470 for storing firmware 472 may be coupled to the bus 460. As another example, a controller, such as a baseboard management controller (BMC) 480, may be coupled to the chipset 406 through the bus 460. BMC 480 may be referred to as a service processor or embedded controller (EC). Capabilities and functions provided by BMC 480 may vary considerably based on the type of information handling system. For example, the term baseboard management system may be used to describe an embedded processor included at a server, while an embedded controller may be found in a consumer-level device. As disclosed herein, BMC 480 represents a processing device different from processor 402, which provides various management functions for information handling system 400. For example, an embedded controller may be responsible for power management, cooling management, and the like. An embedded controller included at a data storage system may be referred to as a storage enclosure processor or a chassis processor.

System 400 may include additional processors that are configured to provide localized or specific control functions, such as a battery management controller. Bus 460 can include one or more busses, including a Serial Peripheral Interface (SPI) bus, an Inter-Integrated Circuit (I2C) bus, a system management bus (SMBUS), a power management bus (PMBUS), or the like. BMC 480 may be configured to provide out-of-band access to devices at information handling system 400. Out-of-band access in the context of the bus 460 may refer to operations performed prior to execution of firmware 472 by processor 402 to initialize operation of system 400.

Firmware 472 may include instructions executable by processor 402 to initialize and test the hardware components of system 400. For example, the instructions may cause the processor 402 to execute a power-on self-test (POST). The instructions may further cause the processor 402 to load a boot loader or an operating system (OS) from a mass storage device. Firmware 472 additionally may provide an abstraction layer for the hardware, such as a consistent way for application programs and operating systems to interact with the keyboard, display, and other input/output devices. When power is first applied to information handling system 400, the system may begin a sequence of initialization procedures, such as a boot procedure or a secure boot procedure. During the initialization sequence, also referred to as a boot sequence, components of system 400 may be configured and enabled for operation and device drivers may be installed. Device drivers may provide an interface through which other components of the system 400 can communicate with a corresponding device. The firmware 472 may include a basic input-output system (BIOS) and/or include a unified extensible firmware interface (UEFI). Firmware 472 may also include one or more firmware modules of the information handling system. Additionally, configuration settings for the firmware 472 and firmware of the information handling system 400 may be stored in the NVRAM 470. NVRAM 470 may, for example, be a non-volatile firmware memory of the information handling system 400 and may store a firmware memory map namespace 400 of the information handling system. NVRAM 470 may further store one or more container-specific firmware memory map namespaces for one or more containers concurrently executed by the information handling system.

Information handling system 400 may include additional components and additional busses, not shown for clarity. For example, system 400 may include multiple processor cores (either within processor 402 or separately coupled to the chipset 406 or through the PCIe buses 408), audio devices (such as may be coupled to the chipset 406 through one of the PCIe busses 408), or the like. While a particular arrangement of bus technologies and interconnections is illustrated for the purpose of example, one of skill will appreciate that the techniques disclosed herein are applicable to other system architectures. System 400 may include multiple processors and/or redundant bus controllers. In some embodiments, one or more components may be integrated together in an integrated circuit (IC), which is circuitry built on a common substrate. For example, portions of chipset 406 can be integrated within processor 402. Additional components of information handling system 400 may include one or more storage devices that may store machine-executable code, one or more communications ports for communicating with external devices, and various input and output (I/O) devices, such as a keyboard, a mouse, and a video display.

In some embodiments, processor 402 may include multiple processors, such as multiple processing cores for parallel processing by the information handling system 400. For example, the information handling system 400 may include a server comprising multiple processors for parallel processing. In some embodiments, the information handling system 400 may support virtual machine (VM) operation, with multiple virtualized instances of one or more operating systems executed in parallel by the information handling system 400. For example, resources, such as processors or processing cores of the information handling system may be assigned to multiple containerized instances of one or more operating systems of the information handling system 400 executed in parallel. A container may, for example, be a virtual machine executed by the information handling system 400 for execution of an instance of an operating system by the information handling system 400. Thus, for example, multiple users may remotely connect to the information handling system 400, such as in a cloud computing configuration, to utilize resources of the information handling system 400, such as memory, processors, and other hardware, firmware, and software capabilities of the information handling system 400. Parallel execution of multiple containers by the information handling system 400 may allow the information handling system 400 to execute tasks for multiple users in parallel secure virtual environments.

The operations described above as performed by a controller, such as the operations performed by embedded controller 170, may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuitry may be configured as a general purpose processor capable of executing instructions contained in software and/or firmware.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Further, a device or system that is configured in a certain way is configured in at least that way, but it can also be configured in other ways than those specifically described. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
   receiving, by an information handling system, a new firmware for updating a device;
   storing, by the information handling system, a copy of a current firmware of the device in a cloud location and a volatile memory;
   updating, by the information handling system, the device with the new firmware after storing a copy of the current firmware in the cloud location and the volatile memory;
   setting, by the information handling system, a first boot flag to perform diagnostics at a next reset of the information handling system based on updating the device with the new firmware;
   determining, by the information handling system at the next reset in response to the first boot flag, whether the device satisfies at least one criteria indicating the new firmware is operational on the device;
   determining that the at least one criteria is not satisfied;
   responsive to determining that the at least one criteria is not satisfied, determining, by the information handling system, if the copy of the current firmware stored in the volatile memory is a working copy;
   determining that the copy of the current firmware stored in the volatile memory is not a working copy;
   responsive to determining that the copy of the current firmware stored in the volatile memory is not a working copy, determining if the copy of the current firmware stored in the cloud location is a working copy;
   and responsive to determining that the copy of the current firmware stored in the cloud location is a working copy, updating, by the information handling system, the device with the working copy of the firmware stored in the cloud location.

2. The method of claim 1, further comprising:
   setting, by the information handling system, a second boot flag to set a future reset of the information handling system for maintaining an operational voltage at the volatile memory during the future reset.

3. The method of claim 2, wherein setting the second boot flag comprises disabling a power button from disconnecting power to the information handling system.

4. The method of claim 1, further comprising:
   storing an update context corresponding to the new firmware in a second volatile memory corresponding to an embedded controller.

5. The method of claim 4, wherein the update context includes at least one of a device version, a device configuration, a firmware version, a network URL, and a reason for performing a restart.

6. The method of claim 1, wherein the device is a solid-state storage device.

7. An information handling system, comprising:
   a memory;
   a processor coupled to the memory, wherein the processor is configured to perform steps comprising:
   receiving, by an information handling system, a new firmware for updating a device;
   storing, by the information handling system, a copy of a current firmware of the device in a cloud location and a volatile memory;
   updating, by the information handling system, the device with the new firmware after storing a copy of the current firmware in the cloud location and the volatile memory;
   setting, by the information handling system, a first boot flag to perform diagnostics at a future reset of the information handling system based on updating the device with the new firmware;
   and determining, by the information handling system at the future reset in response to the first boot flag, whether the device satisfies at least one criteria indicating the new firmware is operational on the device;
   and when the at least one criteria is not satisfied, determining, by the information handling system, if the copy of the current firmware stored in the volatile memory is a working copy;
   when the copy of the current firmware stored in the volatile memory is a working copy, updating, by the information handling system, the device with the working copy of the firmware from the volatile memory;
when the copy of the current firmware stored in the volatile memory location is not a working copy, updating, by the information handling system, the device with a working copy of the current firmware stored in the cloud location.

8. The information handling system of claim 7, further comprising:
setting, by the information handling system, a second boot flag to set the future reset of the information handling system for maintaining an operational voltage at the volatile memory during the future reset.

9. The information handling system of claim 8, wherein setting the second boot flag comprises disabling a power button from disconnecting power to the information handling system.

10. The information handling system of claim 7, further comprising:
storing an update context corresponding to the new firmware in a second volatile memory corresponding to an embedded controller.

11. The information handling system of claim 10, wherein the update context includes at least one of a device version, a device configuration, a firmware version, a network URL, and a reason for performing a restart.

12. The information handling system of claim 7, wherein the device is a solid-state storage device.

13. A computer program product, comprising:
a non-transitory computer readable medium comprising code for performing steps comprising:
receiving, by an information handling system, a new firmware for updating a device;
storing, by the information handling system, a copy of a current firmware of the device in a cloud location and a volatile memory;
updating, by the information handling system, the device with the new firmware after storing a copy of the current firmware in the cloud location and the volatile memory;
setting, by the information handling system, a first boot flag to perform diagnostics at a future reset of the information handling system based on updating the device with the new firmware;
and determining, by the information handling system at the future reset in response to the first boot flag, whether the device satisfies at least one criteria indicating the new firmware is operational on the device;
and when the at least one criteria is not satisfied, determining, by the information handling system, if the copy of the current firmware stored in the volatile memory is a working copy;
when the copy of the current firmware stored in the volatile memory is a working copy, updating, by the information handling system, the device with the working copy of the firmware from the volatile memory;
when the copy of the current firmware stored in the volatile memory location is not a working copy, updating, by the information handling system, the device with a working copy of the current firmware stored in the cloud location.

14. The computer program product of claim 13, further comprising:
setting, by the information handling system, a second boot flag to set the future reset of the information handling system for maintaining an operational voltage at the volatile memory during the future reset.

15. The computer program product of claim 14, wherein setting the second boot flag comprises disabling a power button from disconnecting power to the information handling system.

16. The computer program product of claim 13, further comprising:
storing an update context corresponding to the new firmware in a second volatile memory corresponding to an embedded controller.

17. The computer program product of claim 16, wherein the update context includes at least one of a device version, a device configuration, a firmware version, a network URL, and a reason for performing a restart.

* * * * *